Dec. 21, 1943.                B. WALKER                2,337,074
                  TRACK FOR TRACK LAYING VEHICLES
                       Filed March 17, 1942
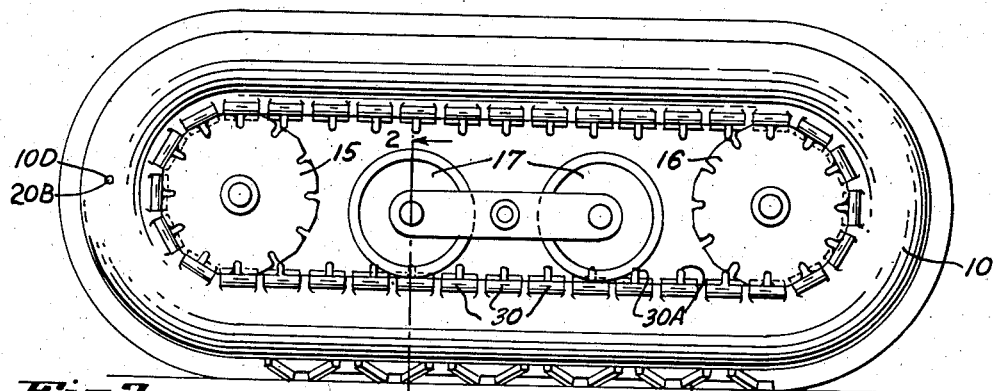
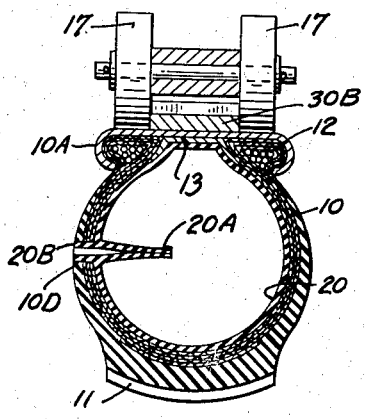
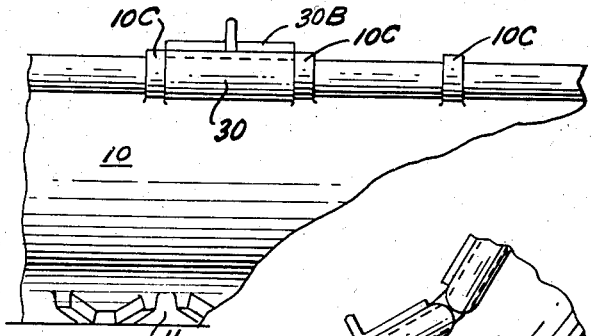
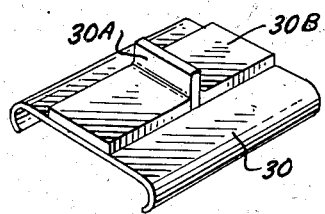
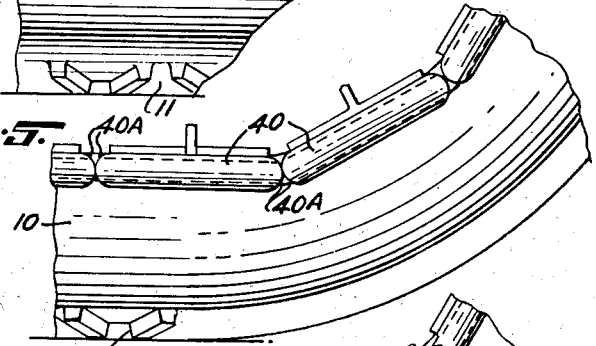
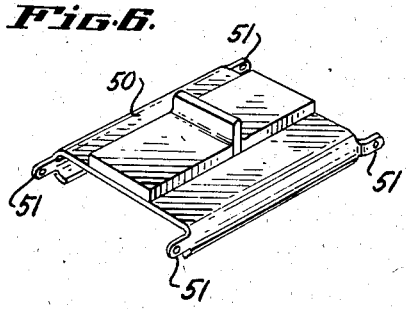
INVENTOR
Brooks Walker Patented Dec. 21, 1943

2,337,074

UNITED STATES PATENT OFFICE 2,337,074

TRACK FOR TRACK-LAYING VEHICLES

Brooks Walker, Piedmont, Calif.

Application March 17, 1942, Serial No. 435,057

6 Claims. (Cl. 305—10)

This invention relates to a track for track-laying vehicles, particularly to a pneumatic type track. The purpose of this invention is to provide a cushion-type continuous belt track suitable for vehicles, whether self-propelled or towed and whether partially supported on such a track or wholly supported, for war equipment such as tanks or track-laying trucks, airplane landing gears, farm tractors, or any other vehicle on which such tracks could be used to advantage. The improved track is characterized by the type of long pneumatic tire of the double-tube type, having a clincher-type rim on the tire adapted to receive a multiplicity of rigid rim clincher elements which are held firmly in place when the tire is inflated and yet permit deflection of the tire to be used as a track layer. The rim segments are preferably designed to give positive traction and positive engagement with the driving wheels in case the track is to be power-driven or to be used as a braking device such as on airplanes. The track is also preferably provided with rim or flange means to take side thrust on the intermediate dollies as well as driving and idler sprockets.

The track segments may be held in place by pockets molded in the tire rim, or separating segments molded in the tire rim, or by having the tire rim segments abut on a curved contact to allow flexibility, or to have the segments suitably hinged or flexibly attached to the adjacent segment. Tension members may be molded into the tire rim to provide flexibility and prevent undesirable stretch of the rim when used as a track-laying pneumatic belt.

With the foregoing and other objects in view, the invention resides in the novel arrangement and combination of parts and in details of construction hereinafter described and claimed, it being understood that changes in the precise embodiment of the invention herein disclosed may be made within the scope of what is claimed without departing from the spirit of the invention.

Practical embodiments of the invention are illustrated in the accompanying drawing in which:

Figure 1 is a side elevation of one form of the invention.

Figure 2 is an end view, partly in section, taken at 2—2 of Figure 1.

Figure 3 is a side elevation, partly cut away, of a section of the tire illustrated in Figure 1, showing a modification of the invention.

Figure 4 is a perspective view of one form of rim segment.

Figure 5 is a side view of a segment of a section of the tire, including a few rim segments, embodying another form of the invention.

Figure 6 is a perspective view of another form of rim segment embodying the invention.

Figure 7 is a side view of a portion of the flexible tire with a few rim segments, similar to the construction shown in Figure 6.

In all figures, like numerals of reference refer to corresponding parts in the drawing.

In Figures 1 and 2 I have shown a flexible pneumatic casing 10 having a heavy tread 11 preferably formed on its ground contact surface, and having a clincher-type rim 10A formed in said casing. Said clincher rim preferably contains flexible tension elements such as steel wires or cables 12 which are substantially non-yieldable under operating tensions and sufficient in strength to take the operating tensions of driving and flexing the pneumatic built track-type tire. A heavy liner 13 is preferably inserted between the tube 20 and the rim segments 30 to prevent a chafing of the tube as the rim segments flex relative to each other during operation.

Driving sprocket 15 is preferably formed with teeth to engage the rim segments to form a positive drive therebetween such as with the vertical projection 30A. Such driving connection is desirable in case the track is to be power-driven or in case the track is to be used on a plane where braking only may be necessary. An idling sprocket 16 is located opposite the driving sprocket and in between may be one or more dolly sprockets 17 adapted to support the load-carrying flat portion of the flexible track in yieldable relationship so as to conform with rough ground surfaces, if necessary. The rim sections 30 may preferably have a raised center portion 30B to act as a flange against idler wheels 17 as well as driving wheel 15 and idler wheel 16, to take care of the side thrust of the tire relative to the vehicle, such as encountered when rounding turns or side hills, resisting winds, etc. The rim segments 30 are preferably separated from each other in the construction shown in Figures 1, 2, 3, and 4 by sections of flexible material such as rubber 10C formed in the rim of the tire between the pockets for each rim segment 30. This prevents the drifting of the rim segments during the operation of the tire as a flexible belt, and prevents the rim segments from getting in contact with each other where it is desired that they remain out of contact during operation of the track belt.

Inner tube 20 is preferably provided with an inwardly extending flexible, collapsible tube 20A of the type used on football bladders with a locating knob 20B extending through an opening 10D in the casing. This provides means for filling the tire with a hollow needle connected with a source of air pressure which when inserted through the tube 10A provides means for admitting air to the inside of the tube to inflate same, or when the needle is inserted through the tube, air can be let out of the tube similar to the method used in connection with football bladders. This eliminates the resulting difficulty of a valve stem coming through the rim which in this case, where the rim is formed of flexible rim elements on which driving, idling, and dolly sprockets run, the normal valve stem would be difficult if not impossible to use. After inflation when the needle is withdrawn, tube 20A collapses from the higher pressure within the tube and suitably seals the air pressure within the tube. It is to be understood, likewise, that any type of sealing tube, bullet-proof or puncture-proof casings and/or tubes, or lifeguard-type tubes can be used within the scope of this invention.

In Figure 5 I have shown an alternate type of construction in which the end position of the rim segments 40 at about the line of the tension elements 12 are formed as a curved end 40A assembled in contact with each other so that during the flexing of the tire 10, the abutting ends 40A of the rim segments will roll on each other. The tire 10 in this case is substantially the same without the rim-separating segments 10C, as shown in the previous figures.

In Figures 6 and 7 I have shown another form of rim segment 50 which has ends 51 extending from the four corners thereof, adapted to receive the end segments from the adjoining segment and to be pivoted thereto so as to form a chain rim, the pivot of which is preferably on the same line as the non-yielding cables 12 of the clincher rim, though with the chain-type rim such as shown in Figures 6 and 7, it might not be necessary to use a non-yielding cable formed in the clincher rim and the rims could be of an elastic nature such as was customary with clincher rims on automobile tires where the tire rim had to be stretched over the rigid wheel rim, as opposed to the straight-type present automotive tire rims which include non-stretching metallic inserts which prevent any substantial stretching of the rim. It is this type of insert, possibly made more flexible than in present tires, that applicant intends should be used in the rim of the tires, as shown in Figures 1 to 5, inclusive.

Other objects of this invention will be more particularly pointed out in the following claims.

I also wish to point out that I do not wish to limit myself to the exact details or modes of operation set forth in this application and drawing, for it will be obvious that wide departure may be made in the way of details without departing from the spirit and scope of my invention, which is as set forth in the following claims.

I claim as my invention:

1. A track for a track-laying vehicle, comprising a double-tube tire, and a rim for said tire, said rim composed of a multiplicity of rigid segments, each having a clincher rim on two sides only of said segments, and a driving sprocket for said track, some of said rim segments being provided with a tooth adapted to engage said driving sprocket.

2. A track for a track-laying vehicle, comprising a double-tube tire, a rim for said tire, said rim composed of a multiplicity of rigid segments, each having a clincher rim on two sides only of said segments, and wheels on which said track operates, a flange between said wheels and said rim segments adapted to take side thrust therebetween.

3. A track for a track-laying vehicle, comprisin a double-tube tire, and a rim for said tire, said rim composed of a multiplicity of rigid segments, each having a clincher rim, said casing having a rim section molded to receive said rim segments in a predetermined position and hold them out of contact with adjoining segments by obstructions molded in the rim adapted to separate said adjoining rim segments.

4. A track for a track-laying vehicle, comprising a double-tube tire, and a rim for said tire, said rim composed of a multiplicity of rigid segments, each having a clincher rim, the rim section of said tire being molded to receive said rim segments and hold them in a predetermined position relative to said tire during the operation of said track.

5. A track for a track-laying vehicle, comprising a double-tube tire, and a rim for said tire, said rim composed of a multiplicity of rigid segments, each having a clincher rim on two sides only of said segments, said rim segments adapted to abut against each other on a curved contact surface.

6. A track for a track-laying vehicle, comprising a double-tube tire with a clincher bead, and a rim for said tire, said rim composed of a multiplicity of rigid segments, each having a clincher rim, said clincher rim being formed with flexible, metallic inserts in said casing to prevent substantial stretch of said clincher bead section during operation as a track-laying pneumatic tread.

BROOKS WALKER.

Patent No. 2,337,074                        Granted December 21, 1943

BROOKS WALKER

The above entitled patent was extended July 24, 1951, under the provisions of the act of June 30, 1950, for 6 years and 214 days from the expiration of the original term thereof.

*Commissioner of Patents.*